United States Patent
Blume et al.

(10) Patent No.: US 8,618,716 B2
(45) Date of Patent: Dec. 31, 2013

(54) ELECTROMECHANICAL MOTOR, ESPECIALLY A PIEZOELECTRIC MICROSTEPPER DRIVE

(75) Inventors: Heinrich-Jochen Blume, Darmstadt (DE); Bernhard Gottlieb, München (DE); Andreas Kappel, Brunnthal (DE); Robert Wolfgang Kissel, Egelsbach (DE); Karl-Heinz Mittenbühler, Griesheim (DE); Tim Schwebel, München (DE); Carsten Wallenhauer, Schwarzheide (DE)

(73) Assignee: Continental Automotive GmbH, Hannover (DE)

( * ) Notice: Subject to any disclaimer, the term of this patent is extended or adjusted under 35 U.S.C. 154(b) by 515 days.

(21) Appl. No.: 12/600,711

(22) PCT Filed: Apr. 22, 2008

(86) PCT No.: PCT/EP2008/054870
§ 371 (c)(1),
(2), (4) Date: Jun. 3, 2011

(87) PCT Pub. No.: WO2008/141882
PCT Pub. Date: Nov. 27, 2008

(65) Prior Publication Data
US 2011/0260580 A1    Oct. 27, 2011

(30) Foreign Application Priority Data
May 18, 2007  (DE) .................. 10 2007 023 199

(51) Int. Cl.
*H02N 2/00* (2006.01)
*H01L 41/09* (2006.01)

(52) U.S. Cl.
USPC .............. 310/323.01; 310/328; 310/331

(58) Field of Classification Search
USPC ........ 310/311, 323.01–323.19, 328, 330, 331
See application file for complete search history.

(56) References Cited

U.S. PATENT DOCUMENTS

| 4,019,073 A | 4/1977 | Vishnevsky et al. |
| 4,782,262 A | 11/1988 | Kiyo-Oka |
| 4,976,553 A | 12/1990 | Yamaguchi et al. |

(Continued)

FOREIGN PATENT DOCUMENTS

| DE | 37 19 362 A1 | 12/1967 |
| DE | 38 41 416 A1 | 7/1969 |
| DE | 1906946 | 9/1970 |
| DE | 37 21 682 A1 | 4/1988 |
| DE | 100 10 392 B4 | 11/2000 |

(Continued)

OTHER PUBLICATIONS

I. Hayashi et al., "Development of Piezoelectric Cycloid Motor" IEE Colloquium on Robot Actuators' (Digest No. 146), Oct. 7, 1991, p. 2/1-2/3, (1991).

*Primary Examiner* — Thomas Dougherty
(74) *Attorney, Agent, or Firm* — Cozen O'Connor

(57) ABSTRACT

A microstepper motor which comprises two electromechanical drive elements, especially piezoelectric bending actuators, having effective directions that are perpendicular to each other. These actuators act upon a drive ring to thereby rotate a shaft. The actuators are non-radially hinged to the drive ring via a torsion-proof, nested frame-type complex structure (drive module) including an interior drive ring, a frame and a U-shaped outer frame. The drive is compact and, the drive module is configured as a single injection-molded structure.

19 Claims, 6 Drawing Sheets

(56) References Cited

U.S. PATENT DOCUMENTS

| | | | |
|---|---|---|---|
| 5,079,471 A | 1/1992 | Nygren, Jr. | |
| 6,664,710 B1 | 12/2003 | Gottlieb et al. | |
| 6,876,129 B2 | 4/2005 | Tsukui et al. | |
| 8,004,149 B2 * | 8/2011 | Blume et al. | 310/323.02 |
| 2003/0057909 A1 | 3/2003 | Tsukui et al. | |
| 2006/0006764 A1 * | 1/2006 | Ganor et al. | 310/328 |
| 2012/0146461 A1 * | 6/2012 | Blume et al. | 310/323.16 |

FOREIGN PATENT DOCUMENTS

| | | |
|---|---|---|
| DE | 10244432 | 4/2003 |
| DE | 103 22 836 A1 | 12/2004 |
| DE | 10 2004 011 724 B4 | 9/2005 |
| EP | 1098429 | 5/2001 |
| JP | 60180481 | 9/1985 |
| JP | 3273871 | 12/1991 |
| WO | WO 2007144277 | 12/2007 |
| WO | WO 2008034651 | 3/2008 |

* cited by examiner

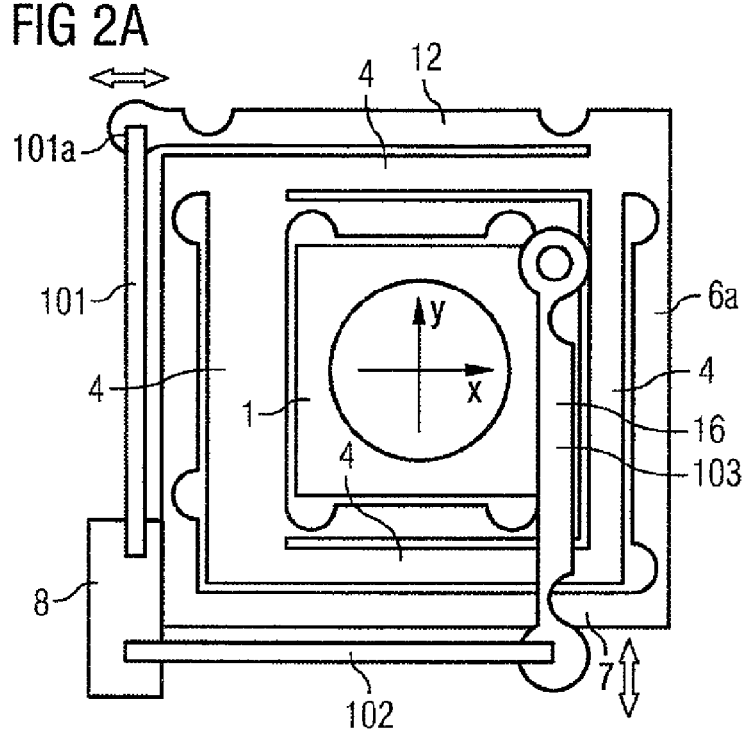
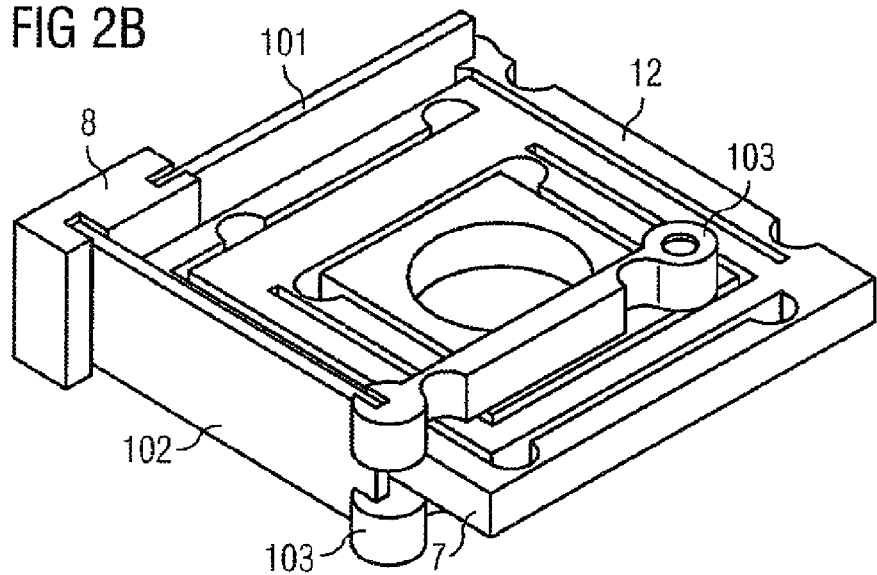
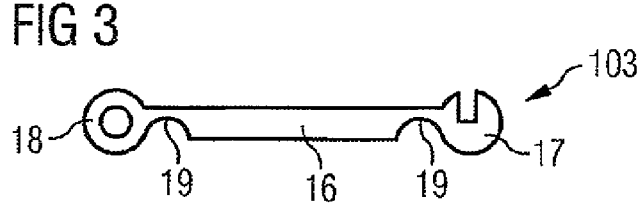

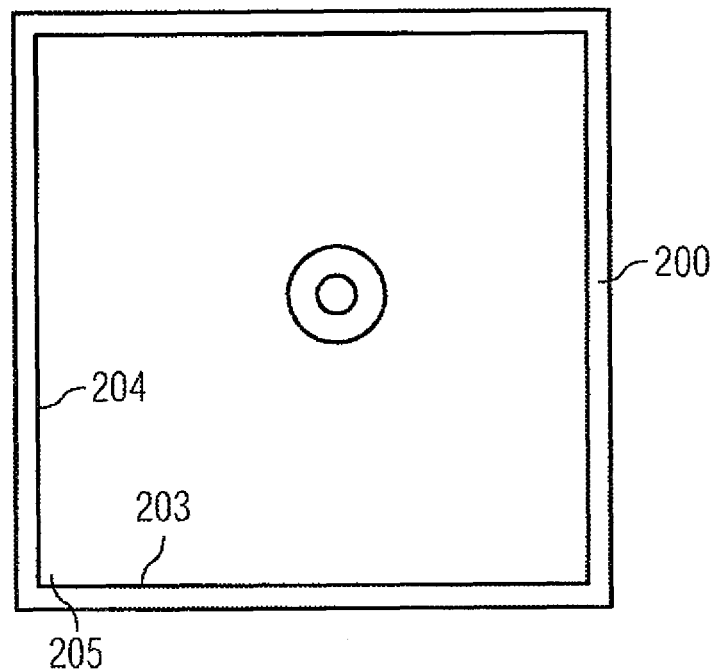
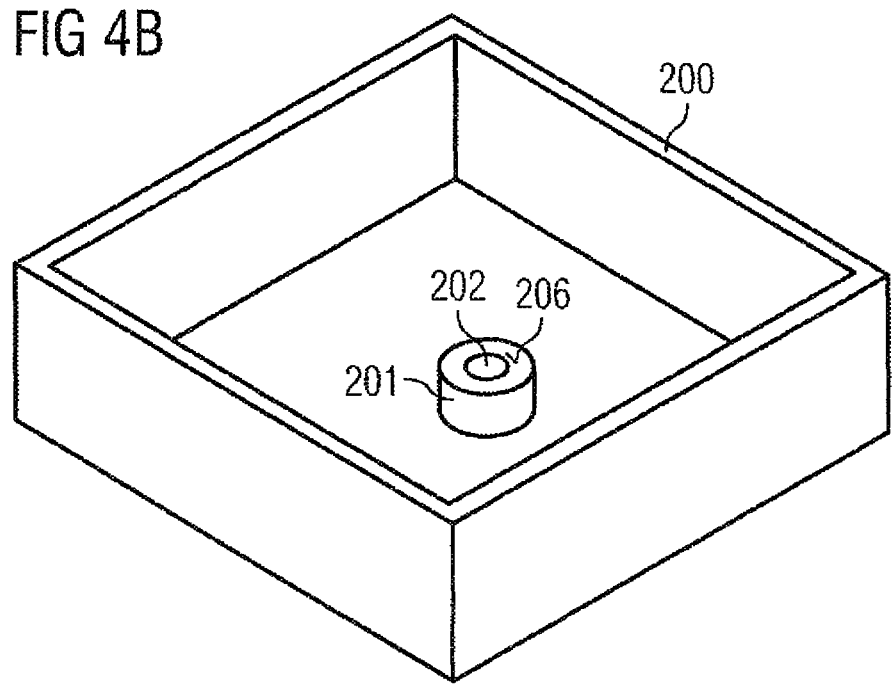

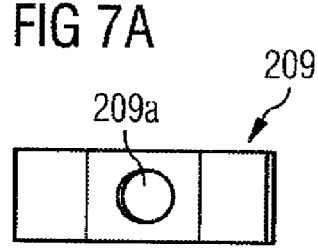
FIG 7A
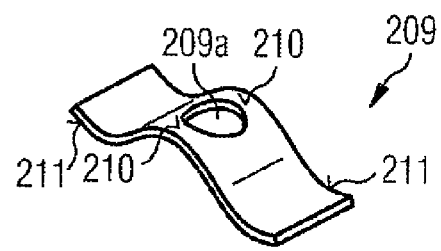
FIG 7B
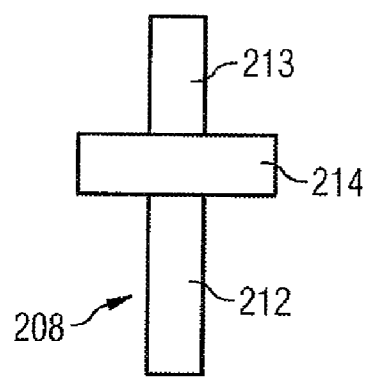
FIG 8A
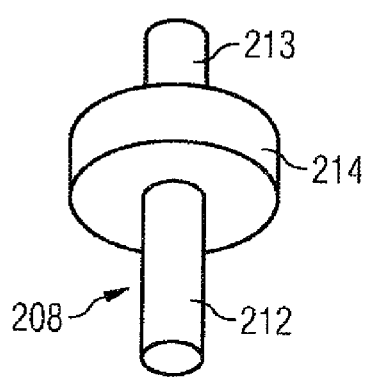
FIG 8B
FIG 9
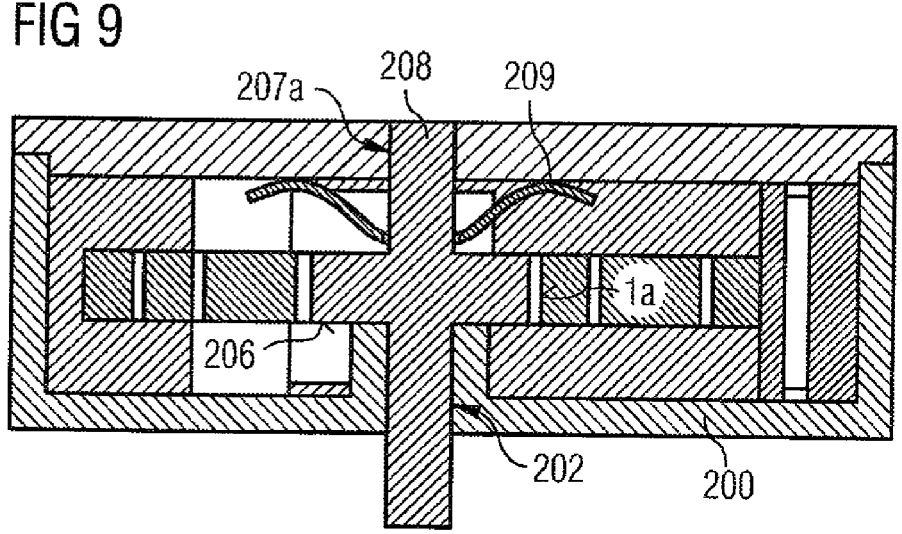

ELECTROMECHANICAL MOTOR, ESPECIALLY A PIEZOELECTRIC MICROSTEPPER DRIVE

PRIORITY CLAIM

This is a U.S. national stage of application No. PCT/EP2008/054870, filed on Apr. 22, 2008, which claims Priority to the German Application No.: 10 2007 023 199.9, filed: May 18, 2007; the contents of both being incorporated herein by reference.

BACKGROUND OF THE INVENTION

1. Field of the Invention

The present invention relates to an electromechanical motor, especially a piezoelectric actuating drive.

2. Prior Art

The cockpit of a motor vehicle attempts to achieve an optimum interplay between design and technology. Various pointer instruments are located within the field of view of the driver. These pointer instruments must meet different technical requirements and have a competitive price for mass production of motor vehicles. The "Messwerk 2000" by the company Siemens VDO is an example of such a pointer instrument.

The "Messwerk 2000" is a four-pole stepper motor drive geared down by a single-stage worm gear drive. The stepper motor is driven by two sinusoidal coil current variations, phase shifted to one another by 90° in phase angle, as a function of time. A sign of the phase shift determines a direction of rotation and a frequency determines a speed of rotation of the motor shaft. Within one full period of 360° of the sinusoidal current variations, up to 128 intermediate stages can be set in a reproducible manner. The utilization of these intermediate stages is called microstepper operation.

A complete "Messwerk 2000" actuating drive containing the stepper motor characterized above consists of 12 single parts. The stepper motor is composed of two coils with a common stator plate and a permanent-magnet rotor. With regard to the component costs, the coils and permanent magnet account for most of the costs. Apart from the material costs, the production costs are also decisive for the prices which increase approximately proportionally as the number of components of the actuating drive increases.

In EP 1 098 429 B1, an electromechanical motor operates without rotating coils. During operation, a drive ring is displaced whilst rotating by an operation, offset in time, of at least two electromechanical drive elements so that, by a direct transfer of force from the drive ring to the shaft, which is located within the drive ring, the shaft is rotated. The rotating displacement movements of the drive ring can be produced by an actuator which, e.g., is driven piezoelectrically, magnetostrictively, electrostrictively or electrodynamically, so that an actuating drive which is better suited for mass production with regard to material costs and production costs is obtained. The piezoelectric actuators are attached to the drive ring in such a manner that their respective displacement acts radially on the drive ring in which context, if necessary, other measures are also taken to achieve an introduction of force on the drive ring which is as symmetric as possible.

Although the technical circumstances mentioned last result in a drive optimized with regard to function, having the best constant-velocity characteristics (constancy of rotational speed independently of the instantaneous position of the shaft) without torque fluctuations, the longitudinal extent and the radial arrangement of the bending actuators entail that the planar drive variants require considerable space in the plane and in most cases appear to be not very compact. However, compact planar drives are urgently needed due to the very narrow installation space conditions given in cockpit instruments.

SUMMARY OF THE INVENTION

An object of the present invention is to provide a stepper drive optimized with regard to the number of parts, production expenditure, requirement of installation space and functionality, especially a microactuating drive for meter movements of cockpit instruments.

This object is achieved by an electromechanical motor, especially a piezoelectric microstepper motor. Advantageous embodiments and developments of the present invention can be found in the description following, the drawings and the dependent claims.

The electromechanical stepper drive according to the invention has the following features.

Two electromechanical, preferably piezoelectric, drive elements (actuators) that exhibit effective directions are aligned approximately perpendicularly to one another, and a shaft is supported rotatably in a drive ring in such a manner that the drive ring can be excited by a deflection of the piezoelectric drive elements into the respective effective direction to perform a displacement movement which can be transmitted directly to the shaft, in such a manner that the shaft rolls in the drive ring and as a result rotates. Furthermore, an approximately rectangular stiff frame and an outer frame, enclosing the frame in a U-shape, with U-legs and a basic element arranged approximately in parallel with one of the two effective directions are provided so that the frame connected to the ends of the U-legs can be displaced in the form of a shearing into the effective direction parallel to the basic element almost free from forces relative to the basic element, the drive ring arranged within the frame and linked to the frame via rod elements arranged approximately in parallel with the basic element also being displaceable relative to the frame in the form of a shearing in the effective direction perpendicular to the basic element. In this context, the drive element belonging to the parallel effective direction is hinged to the frame and the drive element belonging to the perpendicular effective direction is hinged to the drive ring.

Due to the specific, partially rigid, partially shear-flexible but torsionally rigid linking of the elements or their parts, the overall structure according to one embodiment of the invention with three elements nested inside one another in the form of a frame-drive ring, frame and outer frame-implements a 'frame kinematics' in which, in contrast to the prior art, it is no longer necessary to pay attention to the radial force introduction of forces provided by the bending actuators into the drive ring with respect to the center point of the annular hole since the torque caused by the non-radial eccentric force introduction onto the drive ring is absorbed essentially without torsion by the overall structure and the fixing thereof at one of its corners, for example in a housing. This opens up the possibility of a space-saving arrangement of the drive elements, especially along the outer sides of the overall structure which is in the form of an approximately square frame. This makes it possible to achieve a very compact installation-space-saving structure of the stepper drive. The stepper drive according to the invention is characterized by a very low number of simple components so that it is especially suitable for mass production. Furthermore, a thermal detuning of the drive occurring due to different thermal expansion of plastic and actuator is constructionally reliably absorbed. Due to positive locking, e.g. by a toothing formed between drive ring and shaft, a very high actuating accuracy of the drive according to the invention is achieved in purely controlled operation without having to use sensors and a closed loop.

According to one embodiment of the invention to optimize compactness, it is not attempted to achieve an absolutely completely symmetric application of force to the drive ring. The consequences possibly resulting from this with regard to the function, e.g. slight constant-velocity and torque fluctuations, can be reduced by further measures to such an extent that the customer's specifications are still adhered to.

In particular, small torques are compensated for by driving the drive elements in a way modulating the pure sinusoidal variation.

In one embodiment of the invention, the distribution of the shearing capability to the three elements or their linking relative to one another is achieved by the fact that the U-legs of the outer frame are in each case linked to the basic element and to the frame by flexure hinges and that the rod elements are also in each case linked to the drive ring and to one of the two frame elements, arranged perpendicularly to the basic element, of the frame by flexure hinges. The paired approximately parallel arrangement of the rod elements and of the U-legs of the outer frame has the consequence that the drive ring can shear relative to the frame, and the frame can shear relative to the basic element of the outer frame, easily (i.e. almost free from forces). In contrast, the overall structure in the form of a frame constructed in this manner counteracts torsion with high resistance.

The flexure hinges can be formed in each case by a tapering of the cross section of the rod elements and of the U-legs of the outer frame in a short section which is of advantage especially with respect to production.

For the application of force, at least one peg is integrated at the drive ring for rigidly securing in each case a yoke element arranged perpendicularly to the basic element, the drive element belonging to the perpendicular effective direction engaging the opposite end of the yoke element. The engagement, required geometrically in the overall structure according to the invention, of the perpendicular effective direction or of the associated drive element, respectively, in the interior of the frame-shaped overall structure, namely at the drive ring itself, can thus be implemented in a simple manner with respect to production.

With regard to the application of force with respect to the "parallel effective direction", an embodiment is of special advantage in which the linking of the end of one of the two U-legs of the outer frame to the frame is constructed as a frame corner to which a compression-tension rod is linked which is arranged outside and in parallel with the frame element connecting the ends of the U-legs and extends with its free end past the end of the frame element opposite to the frame corner, the drive element belonging to the parallel effective direction engaging the free end of the combustion-tension rod.

According to the two last-mentioned embodiments, the compression-tension rod and/or the yoke element can also exhibit a flexure hinge towards each of their two ends. This shear-flexible hinging of the two electromechanical, preferably piezoelectric drive elements to the drive ring results in the advantage that their directions of movement are decoupled from one another so that the drive elements do not impede one another in their movement, or to a negligibly low extent. Thus, no power losses occur in the application of force.

The two electromechanical drive elements can be constructed especially advantageously as bending actuators, preferably piezoelectric bending actuators.

Such solid-state bending actuators based on piezoelectric ceramic materials have been used in different types of design for many years. They are distinguished by a small design, a low energy demand and high reliability. Thus, for example, a piezoelectric bending actuator has a service life of at least $10^9$ cycles in an industrial environment. The bending actuators used in a microactuating drive for, for example, pointer instruments are typically dimensioned in such a manner that they have a free deflection within a range of approx. 0.2 mm to 2 mm at their moving end. In addition, a blocking force within a range of from 0.5 N to 2 N is achieved in the case of a blockage of the deflection of the freely moving end of the bending actuator. The approximately straight-line deflection of the bending actuator is in each case transverse with respect to its greatest longitudinal extent. The direction of deflection corresponding to the effective direction of the bending actuator is thus approximately orthogonal to the longitudinal axis of the bending actuator.

A particularly compact variant of the stepper drive according to the invention is obtained by an arrangement in which the basic element of the outer frame is rigidly coupled at one of its end areas to a fixing element which can be fixed in a housing and which has two receptacles which are in each case provided for the stiff securing of a bending actuator at its resting end so that in each case one bending actuator is arranged laterally outside the basic element or one of the U-legs of the outer frame, respectively.

According to a development of the last-mentioned embodiment, it is advantageous to construct the frame with drive ring, the outer frame and the fixing element together as a drive module fabricated in one piece in plastic injection-molding technique, the bending actuators also being injected into the drive module. Implementing the drive module in plastic injection-molding technique is simple and cost effective, including the bending actuators in the injection molding process reducing the number of production steps even further.

To support the drive module stiffly and to support the associated shaft rotatably, respectively, it is advantageous to provide an approximately cuboidal housing with a lid, a central bearing block with a support surface and with a first bearing hole being provided in the housing and a second bearing hole for the shaft being provided in the lid and a fixing element, which is provided for fixing and is rigidly coupled to the base element, being arranged in a housing corner and stiffly and permanently fixed in such a manner that the at least one cylindrical rolling area of the shaft can roll in an associated rolling area of an annular bore of the drive ring.

BRIEF DESCRIPTION OF DRAWINGS

The preferred embodiments of the present invention will be explained in greater detail with reference to the accompanying drawing, in which:

FIGS. 2A and 2B are the same views as FIG. 1 with bending actuators and yoke elements;

FIG. 3 is a top view of the yoke element according to FIG. 2;

FIGS. 4A and 4B are, in each case in the same view as FIG. 1, a housing for supporting the shaft and the drive module;

FIGS. 7A and 7B show, in each case in the same view as FIG. 1, a view of a yoke spring, FIGS. 8A and 8B show, in each case in the same view as FIG. 1, a shaft for the stepper drive according to the invention; and FIG. 9 shows an axial cross section along the z axis through the drive in the assembled state.

DETAILED DESCRIPTION OF THE DRAWINGS

Figure 1A:
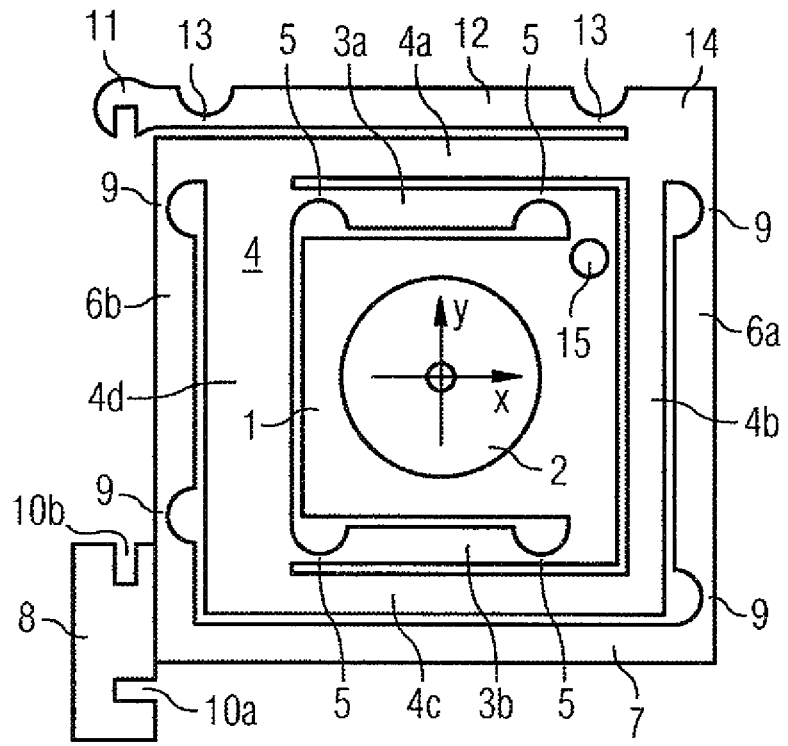
FIGS. 1A and 1B are a drive module for the stepper drive according to the invention, in a top view and in a perspective view, respectively.

According to the invention, a piezoelectric stepper motor is presented which allows a continuous and uniform rotation to be generated by superimposing suitable periodic linear movements of the bending actuators. For this purpose, the bending actuators 101, 102, of FIG. 2, are coupled to a flat drive ring 1 by an overall structure in the form of a nested frame ensuring shear-flexibility in the x-y plane, in which the frame kinematics according to the invention are implemented, such that the drive ring can be translated along the mutually perpendicular effective directions x and y of the bending actuators 101, 102 shown in FIGS. 2A and 2B. The rectangular frame 4, together with the drive ring 1, the U-shaped outer frame 6a, 6b, and 7, the fixing element 8 and, if necessary, the integrated bending actuators 101, 102 will be called "drive module" in the text which follows. The drive module can be produced of polyethylene, injection-molded plastic, POM or of other suitable materials with the aid of an injection-molding technique.

Figure 1B:
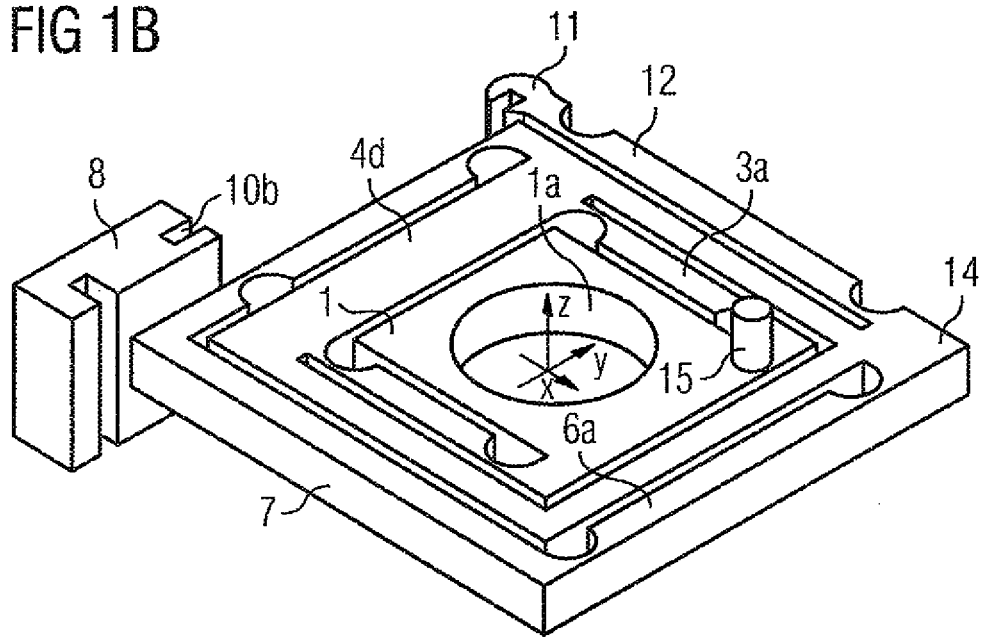

FIG. 1A shows the drive module in a top view and FIG. 1B in the perspective. The drive ring 1 contains a cylindrical annular bore 2, the axis of which, for example, coincides with the z axis of a Cartesian coordinate system, the x-y plane of which extends in parallel with the plane of the sheet. The drive ring 1 is connected by two rod elements (compression-tension rods) 3a, 3b extending approximately in parallel with one another and aligned approximately in parallel with the x direction in their longitudinal extent, to a mechanically sufficiently stiff frame 4 consisting of four frame elements 4a, 4b, 4c, 4d, which is approximately rectangular and aligned approximately in parallel with the x or y direction, respectively. The compression-tension rods 3a, 3b are linked to the drive ring 1 and to the frame 4 by flexure hinges 5. Like normal hinges, flexure hinges provide for an almost unimpeded rotation of the connected elements relative to one another (but only within a limited angular range). Their operation is based on the bending principle. The local bending is achieved by a selective reduction of the rod cross section in a short section. The reduced rod cross section leads to a greatly reduced flexure stiffness. Since the cross-sectional tapering is greatly localized, however, the axial spring rate stiffness) of the respective rod is scarcely reduced.

The arrangement of the rod elements 3a, 3b, extending paired approximately in parallel one another and in parallel with the x axis, in combination with their linkage to the mechanically sufficiently stiff drive ring 1 and to the mechanically sufficiently stiff frame 4, in each case by flexure hinges 5, has the consequence that the drive ring 1 can be displaced relative to the frame 4 in the form of shearing in the y direction relatively easily (i.e. almost free from forces) (the deflections move in the range of only approx. one hundred micrometers). However, this structure opposes a torsion of the drive ring 1 and a displacement of the ring in the x direction relative to the frame 4, as desired, with a very high resistance.

The frame 4 is connected to a mechanically sufficiently rigid basic U-element 7 by two U-legs (compression-tension rods) 6a, 6b extending approximately parallel with one another and aligned approximately in parallel with the y direction in their longitudinal extent. Together with the basic U-element 7, the U-legs 6a, 6b form a U-shaped outer frame 6 for the frame 4. The basic element 7 is rigidly coupled to a fixing element 8. The mechanically stiff U-legs (compression-tension rods) 6a, 6b are also linked to the frame 4 and to the basic element 7 via flexure hinges 9.

The pairwise arrangement, approximately parallel to the y axis, of the U-legs 6a, 6b in combination with their linkage to the mechanically sufficiently stiff frame 4 and to the mechanically sufficiently stiff basic element 7 by flexure hinges 9 has the consequence that the frame 4 can be displaced relatively easily (i.e. almost free from forces) relative to the basic element 7 and relative to the fixing element 8 in the form of a shearing in the x direction. This structure opposes a torsion of the frame 4 and a displacement of the frame in the y direction relative to the basic element 7 and relative to the fixing element 8, respectively, with the required very high resistance.

As a consequence of the structure of linking the drive ring 1 to the frame 4 and the structure of linking the frame 4 to the fixing element 8 via the basic element 7, the drive ring 1 can be displaced arbitrarily in any direction almost free from forces relative to the fixing element 8 in the x-y plane, but is torsionally rigidly supported. The overall structure is called here "frame kinematics". Any torque engaging the drive ring 1 is transferred to the fixing element 8 by the frame kinematics without the ring 1 being significantly rotated during this process.

As a consequence, according to one embodiment of the invention, it is no longer necessary to pay attention to the radial force application of the forces provided by the bending actuators 101, 102 into the drive ring 1 with respect to the center point of the annular hole 2 since the torque caused by a more or less eccentric non-radial force application to the drive ring 1 is absorbed torsionlessly by the frame kinematics and the fixing element 8 which, in the stepper drive, is rigidly anchored in its housing (compare FIGS. 4A, 4B, 6A, 6B in the text which follows).

As FIGS. 1A, 1B also shows, the fixing element 8 contains receptacles 10a, 10b for the torsionally rigid securing of strip-shaped electromechanical (for example piezoelectric) bending actuators, shown in FIG. 2A, 2B. In the fixing element 8, measures, not shown here, can be provided in order to electrically contact the bending actuators at their resting end (e.g. pressure contact pins, clip contacts, yoke spring contacts etc.). As an alternative, the bending actuators can also be connected electrically in the moving area or at their opposite moving end, respectively.

To accommodate the moving end 101a, shown in FIG. 2A, of the bending actuator 101 to be inserted into the receptacle 10b of the fixing element 8, a suitable receiving body 11 is provided which is secured approximately to the right-hand upper corner 14 of the frame 4 via a rigid compression-tension rod 12 and two flexure hinges 13.

The drive ring 1 contains, e.g., one or two pegs 15 for rigidly securing one or two yoke elements which will be described in greater detail in the text which follows and FIGS. 2A, 2B, and 3.

The drive module according to one embodiment of the invention is shown in FIGS. 1A, 1B only in an exemplary configuration. In the case of a continued parallel arrangement of the basic element 7 with respect to the x axis, e.g., the U-shaped outer frame 6 could enclose the frame 4 from the top in the form of an inverted U and/or the drive ring 1 could be linked to the frame element 4b instead of 4d.

FIGS. 2A, 2B show the drive module with inserted bending actuators 101, 102 and yoke elements 103 in a top view (FIG. 2A) and in a perspective view (FIG. 2B). The bending actuator 101, when electrically activated, deflects in the x direction or generates a force in the x direction in the case of resistance. This movement or force is transferred mechanically rigidly to the rigid frame 4 by the compression-tension rod 12. Since the frame 4 is coupled mechanically stiffly to the drive ring 1 with respect to the x direction, the bending actuator 101 moves the drive ring 1 in the x direction or, respectively exerts a force on it in the x direction. When electrically activated, the bending actuator 102 deflects in the y direction or, respectively generates a force in the y direction in the case of resistance. This movement or force is transferred mechanically rigidly to the rigid drive ring 1 by the compression-tension rod 16 of the yoke 103. Linking the compression-tension rods 12 and 16 to the receiving body 11 and 17 and to the frame 4 and to the counterpiece 18, respectively, and beyond that to the drive ring 1 by flexure hinges 13 and 19 has the effect that the bending actuators 101, 102 act completely independently of one another and cannot influence one another mutually, thus in particular do not need to work against the comparatively high mechanical stiffness of the respective other bending actuator. The movements of the bending actuators 101, 102 are thus decoupled.

If a bending actuator 101, 102 is electrically activated, it bends approximately in the form of a circular arc as a result of which the slope of the tangent of the bending line at the moving end of the bending actuator changes. This type of "rotational movement" is reliably absorbed by the flexure hinges 13, 19. Similarly, a change in the bending length relative to the drive module (e.g. due to different thermal expansion of the frame kinematics and of the bending material) is reliably absorbed by the compression-tension rod coupling 12 and 16 with flexure hinges 13 and 19 in that the rods 12, 16 are rotated minimally without this impairing their force or travel transfer function.

In summary, it must be noted that the bending actuators 101 and 102 move the drive ring 1 completely independently of one another in the x and y direction, respectively, relative to the fixing element 8. Ring torsion is prevented by the frame kinematics.

FIG. 3 shows yoke element 103. The yoke element 103 consists of a compression-tension rod 16, a receiving body 17 for securing the moving end 101a of a bending actuator 101, 102 and a counterpiece 18 be secured to the peg 15 for rigidly securing the yoke element 103 to the drive ring 1 (e.g. by pressing, bonding etc.). The receiving body 17 and the counterpiece 18 are connected to the compression-tension rod 16 via flexure hinges 19. It is possible to insert one or, for reasons of symmetry, two yoke elements 103, compare the embodiment according to FIG. 2B having in each case one yoke element 103 on the front side and rear side of the drive module.

To implement the frame kinematics principle associated with the drive module in a stepper motor, a shaft and a support thereof which is as free of play as possible but rotatable, and a stiff support of the drive module required.

FIGS. 4A and 4B show an approximately cuboid housing 200, suitable for this purpose, in a top view (FIG. 4A) and in a perspective view (FIG. 4B). It contains a central bearing block 201 with a cylindrical sliding bearing hole 202, which—after further assembly—is paired in the form of a narrow clearance fit with the cylindrical sliding surface of a shaft rotating in it. The edge lengths of two adjacent inner edges, for example the inner edges 203, 204 and the position of the axis of the bearing hole 202 are dimensioned such that in the case of a (stiff and non-fatigue-critical) fixing of the fixing element 8, e.g. in the housing corner 205, the axis of the annular hole 2 of the drive ring 1 adjusts itself congruently to the axis of the bearing hole 202. The support area 206 of the bearing block 201 is located in such a manner that the rolling surface of the shaft in the z direction (perpendicularly to the plane of the sheet) comes to lie at a height which corresponds to the z position of the annular hole 2 so that the shaft, when the bending actuators 101, 102 are suitably activated, can roll in the cylindrical inner surface 1a, compare FIG. 1B of the annular hole 2.

Figure 5A:
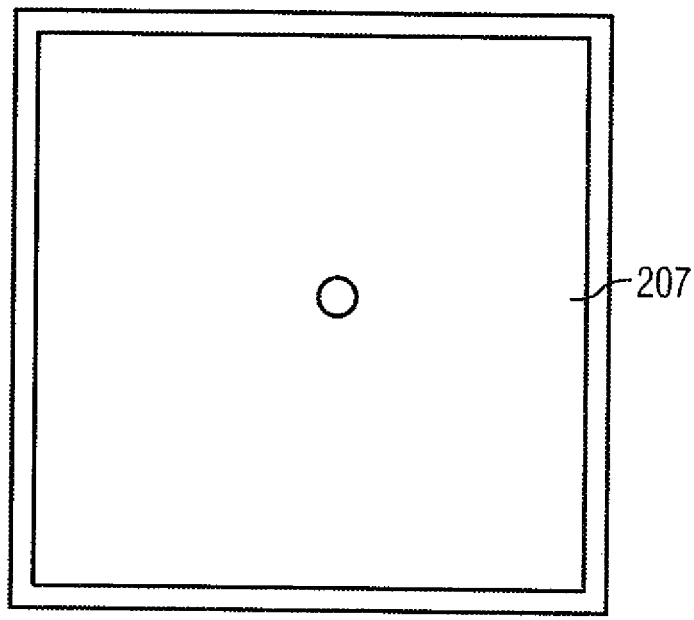
FIGS. 5A and 5B are, in each case in the same view as FIG. 1, a lid fitting the housing according to FIG. 4.
Figure 5B:
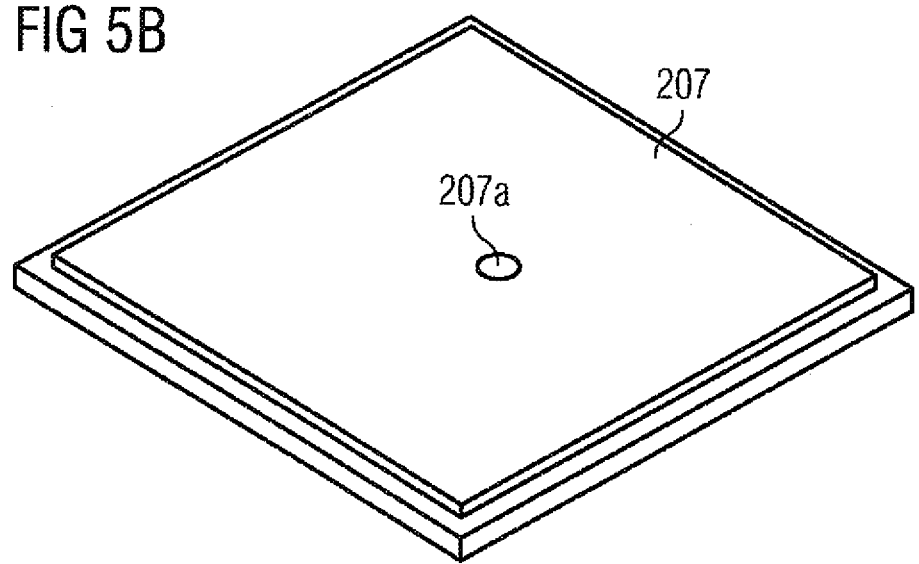

FIGS. 5A, 5B show a lid 207, fitting the housing 200, with a second bearing hole 207a which, as shown here, can be constructed as a through hole or, alternatively, for reasons of simplified encapsulation against media or moisture, as a blind hole which is paired with a second cylindrical sliding surface of the shaft in the form of a rotatable, but narrow clearance fit, the bore axis of which, when the lid 207 is inserted into the housing 200, comes to lie congruently to the axis of the annular hole 2 and the axis of the first bearing hole 202 in the housing 200.

Figure 6A:
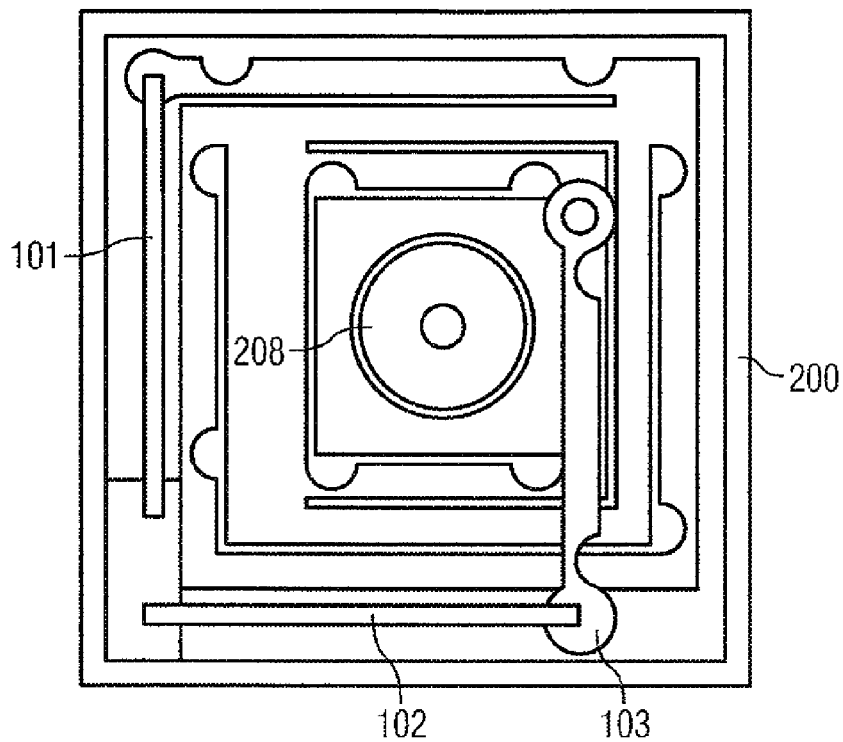
FIGS. 6A and 6B are, in each case in the same view as FIG. 1, a partial assembly of the stepper drive.
Figure 6B:
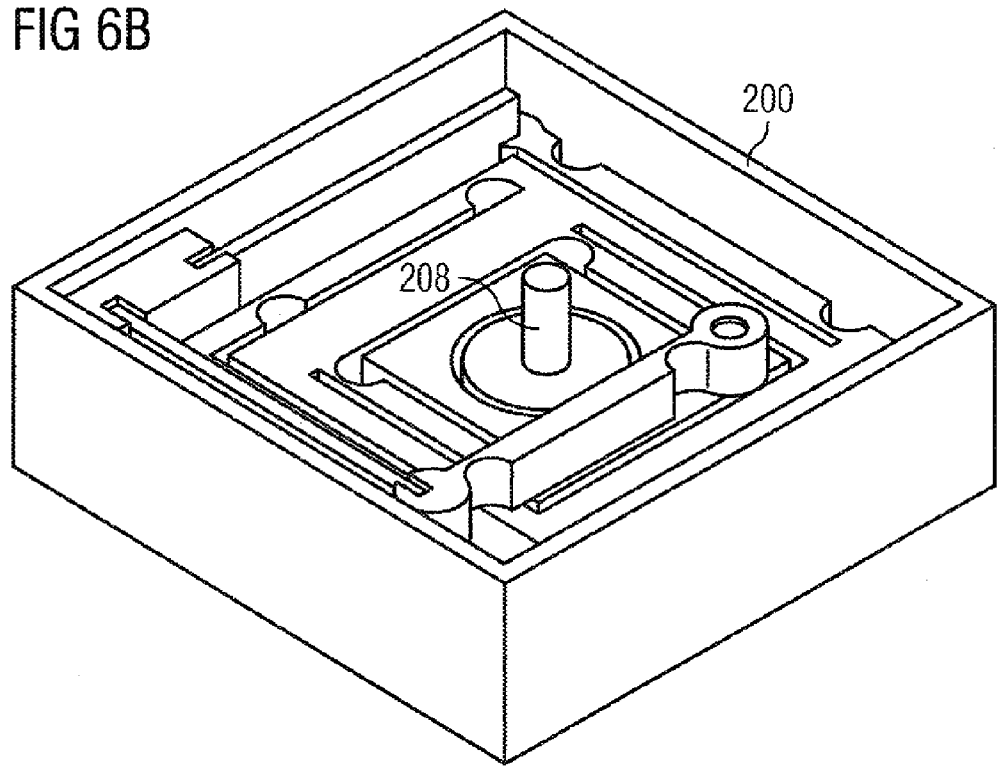

FIGS. 6A, 6B show shows a partial assembly of the stepper drive according to the invention, with a drive module mounted in the housing 200, inserted bending actuators 101, 102, inserted shaft 208 and inserted yoke elements 103.

FIGS. 7A, 7B show shows a suitable yoke spring 209. The yoke spring 209 contains a hole 209a for passing the shaft axle, which ensures that it cannot 'migrate' in operation. The yoke spring 209 is supported on the shaft 208 via areas 210 close to the axis of the hole in the form of a contact line in order to keep any braking torque generated by friction on the shaft 208 as small as possible. The lower surfaces 211 located far outside are used for supporting the yoke spring 209 on a lid surface. The mounted yoke spring 209, compare also FIG. 9, is supported on the one hand on the shaft 208 and on the other hand, with the lid 207 inserted, on a surface of the lid 207, with sufficient force albeit low force, for keeping the shaft 208 at rest on the support surface 206 of the bearing block 201 but without causing significant friction forces which would impede the rotation of the shaft 208. This ensures that the rolling areas of drive ring 1 and shaft 208 remain localized with respect to one another sufficiently accurately in the z direction under all operating conditions.

FIGS. 8A, 8B show a suitable shaft 208. It has two cylindrical sliding bearing surfaces 212, 213 paired with the cylindrical inner surfaces of the bearing bores 202, 207a, and at least one cylindrical rolling area 214 which is paired with at least one rolling area 1a of the annular bore 2, compare FIG. 1B. In this case, the axial extension of the surface 212 is used for connecting the respective element to be driven by the stepper motor.

FIG. 9 shows an axial cross section along the z axis through the drive according to the invention in the assembled state. In particular, it shows the position of its components with respect to one another. The shaft 208 can be rotated with low friction around the z axis at two places in the form of narrow clearances by the sliding-surface pairs 207a, 213 and 202, 212 but is supported mechanically rigidly with respect to translation. A suitable yoke spring 209, in interaction with the support surface 206, keeps the shaft 208 fixed in a low-friction manner with respect to the z direction. In a state of rest, the drive module keeps the rolling area 1a of the annular bore 2 both concentrically and in the z direction in a suitable position relative to the rolling area 214 of the shaft 208. With the aid of suitable electrical activating functions, the bending actuators 101, 102 in each case perform at their moving end 101*a* deflections with a sinusoidal or cosinusoidal variation in time around the rest position, as a result of which the rolling area 1*a* of the annular bore 2 is kept to rest against the rolling area 214 of the shaft 208 and is moved around the rolling area 214 of the shaft 208 in the form of a circular displacement movement and, as a result, rotates the shaft 208. The direction of rotation is established by the relative phase angle of the x and y deflections of the drive ring 1, respectively and the speed of rotation is established with the aid of the control frequency.

In the simplest case, force is transmitted from the drive ring 1 to the shaft 208 by friction. In this context, slippage can occur in dependence on the load torque acting on the shaft 208, of an actuating drive constructed in this manner, which reduces the accuracy of the actuating drive. The slippage is preferably reduced by the introduction of a positive fit between the rolling areas of drive ring 1 and shaft 208, especially by applying a toothing to the inner surface 1*a* of the drive ring 1 and to the outer surface 214 of the shaft 208. In this arrangement, the drive ring 1 and the shaft 208 preferably exhibit a tooth difference of at least 1. This means that the toothing of the inner surface of the drive ring 1 comprises at least one tooth more than the outer surface 214 of the shaft 208. If drive ring 1 and shaft 208 are operated within the actuating drive in such a manner that the toothing does not drop out of engagement, the actuating drive ideally works free of slippage.

A cycloidal toothing of drive ring 1 and shaft 208 is considered to be especially preferred. In the case of the cycloidal toothing, almost one half of all teeth is engaged as a result of which a high torque can be transferred between drive ring 1 and shaft 208. The number of teeth located on the inner surface l*a* of the drive ring 1 and the outer surface 214 of the shaft 208 initially establishes a gearing-down of the actuating drive which is typically within a range of 20:1 to 200:1. To set the actuating drive further by only one tooth, that is to say to rotate the shaft 208 by one tooth further by the drive ring 1, a complete period of the driving sinusoidal signal of the actuator drive must be preferably passed. Since it is necessary to pass through one cycle of the drive signal for advancing by one tooth, the actuating drive is distinguished by high accuracy and by a high repetition accuracy. In addition, the number of teeth and the utilization of one cycle of the drive signal per tooth makes it possible to achieve a high angular resolution of the actuating drive. In addition to this, it is possible to interpolate arbitrarily within one period of the drive signal in order to ensure a microstepper operation of the actuating drive. The actuating drive according to preferred designs thus supplies a high efficiency, high gearing-down, a high transferrable torque based on the toothing of drive ring 1 and shaft 208, freedom from slippage during the transmission of the torque, arbitrary interpolation of the angle of rotation within one tooth of the shaft 208 (microstepper operation), low drive torque fluctuations (ripple) and a low loading on tooth flanks for drive ring 1 and shaft 208 so that the wear is also reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electromechanical motor, comprising:
two electromechanical drive elements exhibiting respective motion directions aligned substantially perpendicular to one another;
a drive ring configured to be activated by a deflection of the electromechanical drive elements to perform a displacement movement;
a shaft supported rotatably in the drive ring, configured for the displacement movement to be transmitted to the shaft, such that the shaft rolls in the drive ring in response to the displacement movement;
a stiff substantially rectangular frame;
an outer frame enclosing the rectangular frame in a U-shape, comprising two respective U-legs, the U-legs each having a respective first free end and are joined at respective opposite ends by a basic element, the basic element arranged approximately in parallel with one of two effective motion directions of the two electromechanical drive elements,
wherein the rectangular frame is connected to the free ends of the U-legs, the free ends of the U-legs being displaceable in the one of the effective motion directions parallel to the basic element; and
rod elements arranged approximately in parallel with the basic element configured to link the drive ring to the frame, the drive ring being displaceable relative to the rectangular frame in the other of the effective motion directions that is perpendicular to the basic element,
wherein one of the two drive elements is hinged to the rectangular frame and the other of the two electromechanical drive elements is hinged to the drive ring.

2. The electromechanical motor as claimed in claim 1, wherein the U-legs of the outer frame are each linked to the basic element and to the frame by flexure hinges, the rectangular frame having four frame elements, two of the frame elements arranged perpendicularly to the basic element and the other two of the elements arranged parallel to the basic element the rod elements, are respectively linked to the drive ring and to one of the two frame elements arranged perpendicularly to the basic element by respective flexure hinges.

3. The electromechanical motor as claimed in claim 2, wherein the flexure hinges are formed respectively by a cross-sectional tapering a short section of the rod elements and of the U-legs of the outer frame.

4. The electromechanical motor as claimed in claim 3, wherein at least one peg is integrated at the drive ring for rigidly securing a yoke element arranged perpendicularly to the basic element, one of the two the drive elements having the effective motion direction perpendicular to the basic element engaging the opposite end of the yoke element.

5. The electromechanical motor as claimed in claim 2, wherein the linking of the free end of one of the two U-legs to the rectangular frame is constructed as a frame corner to which a compression-tension rod is linked, the compression-tension rod is arranged outside and in parallel with the frame element connecting the ends of the U-legs and extends with its free end over the end of the frame element opposite to the frame corner, the one of the two drive elements belonging to the effective motion direction parallel to the basic element engaging the free end of the compression-tension rod.

6. The electromechanical motor as claimed in claim 4, wherein the yoke element exhibits a flexure hinge towards each of its two ends.

7. The electromechanical motor as claimed in claim 1, wherein the two electromechanical drive elements are bending actuators.

8. The electromechanical motor as claimed in claim 7 wherein the basic element is coupled at one of its end areas rigidly to a fixing element, the fixing element configured to be fixed in a housing, the fixing element comprising:
   two receptacles configured for rigidly securing a respective bending actuator at its resting end so that in each case one bending actuator is arranged laterally outside at least one of the basic element and one of the U-legs of the outer frame.

9. The electromechanical motor as claimed in claim 8, wherein the rectangular frame, the outer frame, and the fixing element form a drive module fabricated in one piece in plastic injection-molding technique, the bending actuators also being injected into the drive module.

10. The electromechanical motor as claimed in claim 1, further comprising:
   an approximately cubical housing, the housing comprising:
      a central bearing block having a support surface;
      a first bearing bore extending perpendicularly from the support surface;
   a lid configured to mate with the housing, the lid comprising:
      a second bearing bore configured for the shaft; and
      a fixing element rigidly coupled to the basic element arranged in a housing corner of the housing and stiffly and permanently fixed such that an at least one cylindrical rolling area of the shaft can roll in an associated rolling area of an annular bore of the drive ring.

11. The electromechanical motor as claimed in claim 10, wherein the shaft is constructed with a disk-shaped centerpiece, the first annular front face of rests on the bearing block and the outer surface area of which forms the cylindrical rolling area of the shaft.

12. The electromechanical motor as claimed in claim 11, further comprising a yoke spring configured to secure the axis of the shaft in a z direction the yoke provided with a hole for the passage of the shaft, the yoke supported on a second annular front face of the disk-shaped centerpiece of the shaft, on the lid in an area of the lid such that rotation of the shaft is not significantly impeded.

13. The electromechanical motor as claimed in claim 7, wherein the two electromechanical drive elements are piezoelectric bending actuators.

14. The electromechanical motor as claimed in claim 1, wherein the electromechanical motor is a piezoelectric microstepper drive.

15. The electromechanical motor as claimed in claim 5, wherein the compression tension rod exhibits a flexure hinge each of its two ends.

16. The electromechanical motor as claimed in claim 4, wherein the linking of the free end of one of the two U-legs to the rectangular frame is constructed as a frame corner to which a compression-tension rod is linked, the compression-tension rod is arranged outside and in parallel with the frame element connecting the ends of the U-legs and extends with its free end over the end of the frame element opposite to the frame corner, the one of the two drive elements belonging to the effective motion direction parallel to the basic element engaging the free end of the compression-tension rod.

17. A piezoelectric microstepper drive, comprising:
   a housing, the housing comprising a bearing support extending into a cavity formed by the housing and a housing bearing hole extending longitudinally at least partially through the bearing support;
   a lid configured to mate with the housing, the lid having a lid bearing hole corresponding to the housing bearing hole;
   a shaft supported rotatably in the housing bearing hole and the lid bearing hole, the shaft comprising two bearing surfaces and a rolling area therebetween;
   two electromechanical drive elements aligned substantially perpendicular to one another;
   a drive ring comprising a peg extending perpendicular to a surface of the drive ring and a throughhole configured to mate with the rolling area of the shaft, wherein the rolling area of the shaft is configured to rotate in the throughhole;
   a stiff substantially rectangular frame surrounding and coupled to the drive ring;
   an outer U-shaped frame enclosing the rectangular frame comprising two respective U-legs joined by a basic element, wherein free ends of the U-legs not joined opposite the basic element are displaceable in a direction parallel to the basic element;
   a first rod element arranged approximately in parallel with the basic element configured to couple a first one of the two electromechanical drive elements to one of the free ends of the U-legs;
   a second rod element arranged approximately in perpendicular with the basic element configured to couple a second one of the two electromechanical drive elements to the peg of the drive ring; and
   a fixing element configured to be fixed in the housing proximate to the basic element, the fixing element comprising two receptacles each configured for rigidly securing a respective one of the two electromechanical drive elements.

18. A piezoelectric microstepper drive as claimed in claim 17, wherein the drive ring and the rolling area are each configured with drive teeth.

19. A piezoelectric microstepper drive as claimed in claim 10, wherein the drive ring and the rolling area are each configured with drive teeth.

* * * * *